(No Model.)

R. J. NODERER.
BICYCLE REST.

No. 529,939. Patented Nov. 27, 1894.

Witnesses
C. H. Olds.
Nettie Leighton

Inventor
Robert J. Noderer.
by Wm. M. Monroe
Attorney

UNITED STATES PATENT OFFICE.

ROBERT J. NODERER, OF CLEVELAND, OHIO.

BICYCLE-REST.

SPECIFICATION forming part of Letters Patent No. 529,939, dated November 27, 1894.

Application filed March 9, 1894. Serial No. 502,971. (No model.)

*To all whom it may concern:*

Be it known that I, ROBERT J. NODERER, a citizen of the United States, and a resident of Cleveland, county of Cuyahoga, State of Ohio, have invented certain new and useful Improvements in Bicycle-Rests, of which I hereby declare the following to be a full, clear, and exact description, such as will enable others skilled in the art to which the invention appertains to make and use the same.

My invention relates to improvements in bicycle stands and its objects are to provide self-adjusting mechanism for supporting bicycles varying in the size of wheel and shape of tire, and consists in the combination of automatically closing jaws, with back rest and floor plate, with the combination and arrangement of parts and constructions of details as hereinafter described, shown in the accompanying drawings, and specifically pointed out in the claims.

Figure 1:
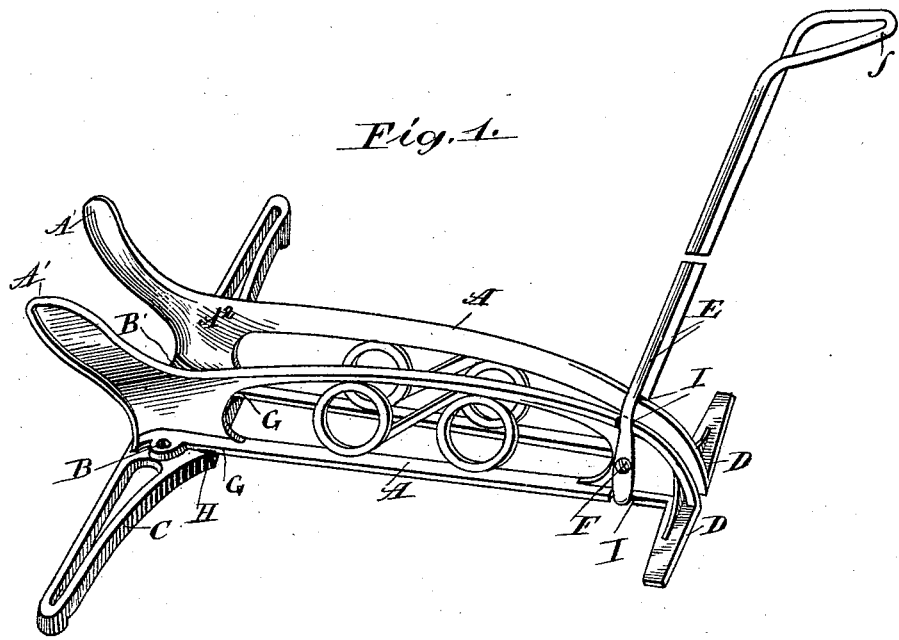
Figure 2:
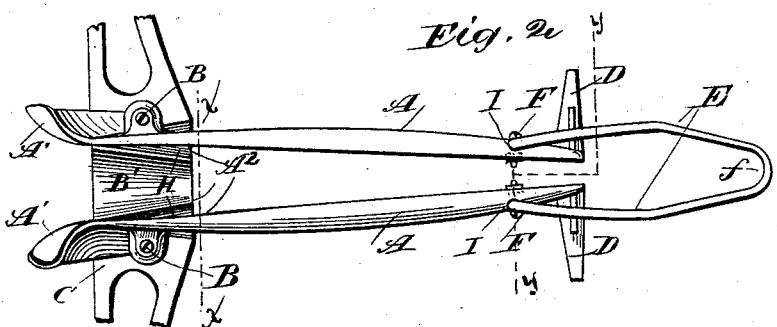
Figure 4:
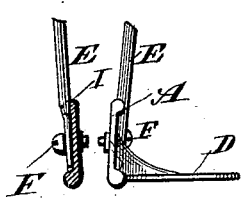
Figure 3:
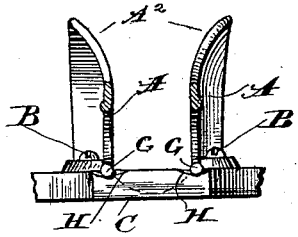

In the accompanying drawings, Figure 1 is a perspective view of the invention. Fig. 2 is a plan view. Fig. 3 is a transverse section on line x—x, Fig. 2. Fig. 4 is a transverse section on line y—y Fig. 2.

In the figures A. A. are clamping jaws, pivoted intermediate of their length at B. B. upon the floor plate C. The rear extremities rest upon the floor at D. D., which are projections provided for that purpose. The outer extremities A'—A'. are raised at the tip and curved to either side to receive the edge of the wheel. As it enters, an incline B' is channeled in the floor plate B to guide the wheel. A re-entrant curve A' is also fashioned in the inner side of each jaw just beyond the swell of the outer extremities A. A, the effect of which is to close behind the edge of the wheel and materially assists in forcing it into the jaws. A spring back rest E is secured removably at F, F, to the rear extremities of the jaws, and is formed in an elongated loop at *f* so that the diverging arms will readily expand as the jaws are shoved apart. Normally the jaws are wide open at the forward end and the openings considerably narrowed toward the rear, but as the wheel is forced to the rear the jaws separate in the rear of the pivot and close in front, thus affording a secure grasp of the tire. In order to restore the jaws immediately to their normal position when thrown apart at either extremity a spring action is obtained by means of the spring back rest E acting in unison with rounded bearing edges G, G, on the lower surface of the jaws where they engage the floor plate, and rounded depressions H, H, broader at rear of the bearing plate than in front in which the edges G, G. are located, and up the inclined sides of which the bearing edges travel as the jaws are moved upon their pivots, the effect of the inclines being obviously to return the jaws to the central and normal position whichever way they are moved. The rear rest E is secured by a simple screw or bolt F in either jaw and is maintained rigidly in position by means of the depressions I, I, into which the diverging members are pressed, thus avoiding complication of parts. I believe myself to be the first to provide automatically closing jaws for this purpose in conjunction with a spring back rest.

The advantages of this device are very great, in the absence of all mechanical complexity, and adaptability to all sizes of wheels.

Having described my invention, what I claim as new, and desire to secure by Letters Patent, is—

1. In a bicycle rest, the combination with pivoted automatically adjustable jaws and floor plate of a spring back rest removably secured to said jaws, substantially as described.

2. In a bicycle rest, the combination with automatically adjustable jaws and a spring back rest removably secured thereto, of a floor plate to which said jaws are pivotally attached, substantially as described.

3. In a bicycle rest, the combination with a floor plate provided with transverse depressions, of jaws pivoted thereto intermediate of their length, and provided with projecting edges normally resting at the lowest part of said depressions in the floor plate, and a spring back rest removably secured to the rear extremities of said jaws substantially as described.

4. In a bicycle rest, the combination with a floor plate provided with transverse depressions H, and front incline B, of jaws pivotally secured to said floor plate intermediate of their length, provided with rounded bearing edges resting in said depressions and outwardly turned front extensions, and a spring back rest removably secured to the rear extensions of the jaws, adapted to automatically close said jaws when opened and to operate in connection with said depressions in the floor plate substantially as set forth.

ROBERT J. NODERER.

Witnesses:
WM. M. MONROE,
C. H. OLDS.